(12) United States Patent
Cannon et al.

(10) Patent No.: US 10,766,396 B2
(45) Date of Patent: Sep. 8, 2020

(54) INSULATED TRANSPORTATION TRAILER

(71) Applicant: WABASH NATIONAL, L.P., Lafayette, IN (US)

(72) Inventors: John Cannon, Fond du Lac, WI (US); Thomas Hitchcock, Oshkosh, WI (US)

(73) Assignee: Wabash National, L.P., Lafayette, IN (US)

( * ) Notice: Subject to any disclaimer, the term of this patent is extended or adjusted under 35 U.S.C. 154(b) by 629 days.

(21) Appl. No.: 15/278,536

(22) Filed: Sep. 28, 2016

(65) Prior Publication Data

US 2017/0096092 A1    Apr. 6, 2017

Related U.S. Application Data

(60) Provisional application No. 62/235,620, filed on Oct. 1, 2015.

(51) Int. Cl.
*B60P 3/22* (2006.01)

(52) U.S. Cl.
CPC ........... *B60P 3/2215* (2013.01); *B60P 3/2205* (2013.01); *B60P 3/2225* (2013.01); *B60P 3/2295* (2013.01)

(58) Field of Classification Search
CPC ...... B60P 3/2215; B60P 3/2205; B60P 3/2225
See application file for complete search history.

(56) References Cited

U.S. PATENT DOCUMENTS

| | | | | |
|---|---|---|---|---|
| 2,744,043 | A * | 5/1956 | Ramberg | B29C 53/602 156/155 |
| 3,158,383 | A * | 11/1964 | Anderson | B60P 3/2225 105/360 |
| 3,969,812 | A * | 7/1976 | Beck | B21D 51/24 29/421.1 |
| 7,069,738 | B2 * | 7/2006 | Omuta | A01J 9/04 165/108 |
| 8,016,322 | B2 * | 9/2011 | Keehan | B61D 5/00 264/516 |
| 9,376,049 | B2 * | 6/2016 | Campbell | F17C 3/00 |

FOREIGN PATENT DOCUMENTS

CA        1078312 A  *  5/1980 ............ B60P 3/2225

OTHER PUBLICATIONS

Patented Stainless Steel Tanks; retrieved from www.cobratanks.com/CobraTanks.pdf on Nov. 29, 2016; 4 pages.
Purdue Extension; retrieved from www.extension.purdue.edu/extmedia/ppp/ppp-93.pdf on Dec. 28, 2016; 56 pages.
Duraplate Working with DuraPlate Fabrication Guidelines; copyright 2014 Wabash National Corporation; all rights reserved; Revision: WCP 0001 12.14; 23 pages.

* cited by examiner

*Primary Examiner* — Kevin Hurley
(74) *Attorney, Agent, or Firm* — Quarles & Brady LLP

(57) ABSTRACT

A transportation trailer can include a cargo tank with a shell that includes an outer wall, an inner wall, and an insulating core between the outer wall and the inner wall. The shell can be unsupported by structural rings, and the cargo tank can be a frameless cargo tank. The cargo tank can be formed by decoiling respective coils of inner-wall material, outer-wall material, and insulating-core material, joining the inner-wall material, the insulating-core material, and the outer-wall material to form a sandwich-type panel, and welding the sandwich-type panel to form the shell.

21 Claims, 8 Drawing Sheets

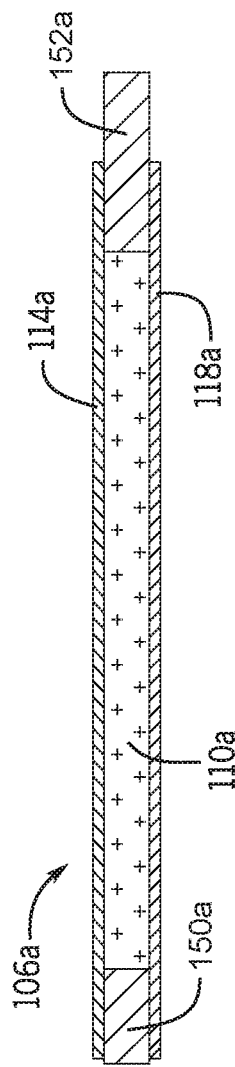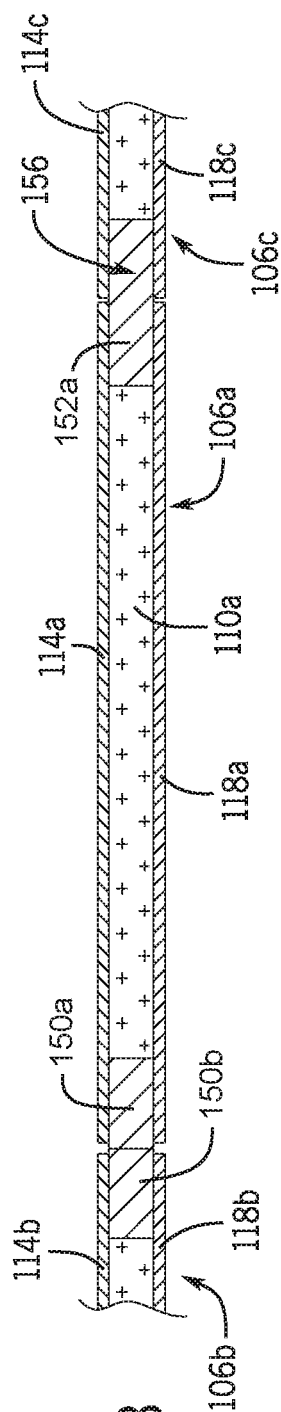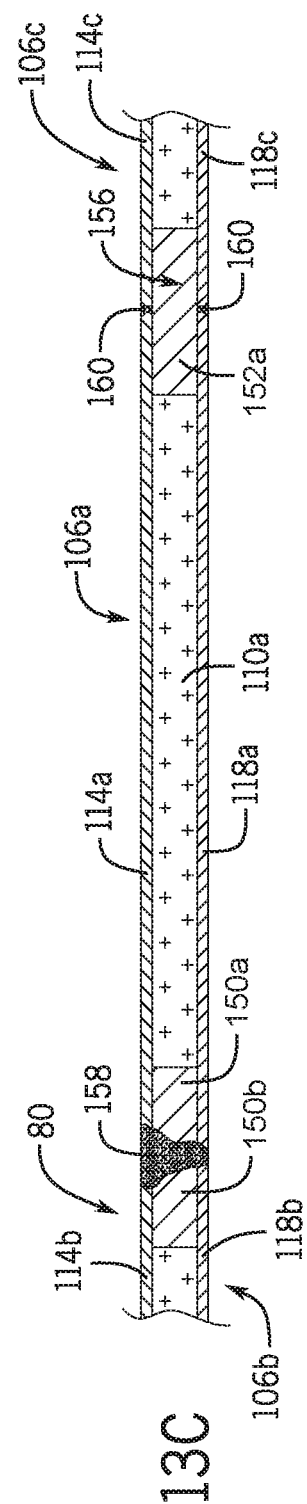

INSULATED TRANSPORTATION TRAILER

RELATED APPLICATIONS

This application claims the benefit of U.S. Provisional Patent Application No. 62/235,620, which was filed on Oct. 1, 2015. The disclosure of such application is hereby incorporated by reference herein in its entirety.

FIELD OF THE INVENTION

The present invention relates generally to transportation trailers, including to those having cargo tanks. In particular, the present invention relates to insulated cargo tanks for transportation trailers.

BACKGROUND

Transportation trailers having cargo tanks are used to carry a variety of products, including both food-grade and non-food-grade products. Generally, to be effective, insulated cargo tanks must be able to maintain the product carried therein at a certain temperature for a certain amount of time.

In addition to considerations regarding heat transfer, design of cargo tanks can also take into account considerations of weight. In particular, cargo tanks contribute to the total weight of tractor-trailer rigs, which can be required by various laws and regulations to be less than a predetermined maximum weight.

For these and other reasons, it may be beneficial to provide a transportation trailer with a relatively lightweight and relatively well-insulated cargo tank.

SUMMARY

Generally, as also noted above, it may be useful for a transportation trailer to include a relatively well-insulated cargo tank, and to exhibit a relatively low un-loaded total weight. For example, in the transport of food-grade products, it may be necessary to maintain the products at or below a target temperature to ensure appropriate freshness of the products. Similarly, a transportation trailer with relatively low total weight, as compared to conventional trailers, can permit the transport of a relatively greater amount of cargo without exceeding a regulatory weight limit.

Embodiments of the present invention can address these needs, and others, in various ways. In some embodiments of the invention, a cargo tank of a transportation trailer can be relatively low total weight, while also provide substantially effective wall insulation and reducing in number, or even eliminating, thermal bridges between the interior of the cargo tank and the exterior of the cargo tank.

To provide reduced weight, but also strong and well insulated cargo tanks, some embodiments of the invention can include cargo tanks formed with layered, or "sandwich-type," construction. For example, in some embodiments, a cargo tank can include relatively thin inner and outer layers (e.g., of thin stainless steel or other materials) and relatively thick intervening insulation. This type of construction can provide cargo tanks with relatively high strength as well as relatively significant insulating capabilities.

In some embodiments, improvements in strength or weight relative to some conventional designs may result from use of a cargo tank with a relatively rigid outer wall, which is spaced apart from an inner wall of the cargo tank by an intermediary core configured to provide structural support to the cargo tank. By spacing distinct inner and outer walls apart from each other, a greater section modulus for the tank as a structural body can be obtained. Accordingly, for example, an appropriately rigid outer wall in a sandwich-type cargo tank can allow for an inner wall of the cargo tank to have a reduced thickness relative to tank walls of some comparable conventional designs.

In some embodiments, in contrast to conventional tanks, a cargo tank with a sandwich-type construction can be sufficiently strong to avoid the need for metal support rings arranged along its length. Generally, this can result in relatively substantial weight savings, due to the elimination of the ring material from the overall tank design. Additionally, because support rings can provide a thermal bridge between the interior and exterior of a tank, eliminating support rings from a cargo tank design can provide significant improvement in overall tank insulation. Further, because metal support rings are often welded to conventional cargo tanks, elimination of support rings from a tank design can reduce the cost, complexity and other disadvantages that may result from relatively extensive welding operations.

Some embodiments of the invention can provide reductions in trailer weight, as compared to conventional designs, in other ways. In some embodiments, the use of a sandwich-type construction for a cargo tank can allow for the exclusion of extended frame rails from an associated transportation trailer. For example, in order to maintain the structural integrity of conventional cargo tank formed from plastic (e.g., fiber-reinforced plastic ("FRP")) or other materials, metal support rails may be required to extend over a substantial portion of the length of the cargo tank (and of an associated transportation trailer). Because of the required length and structural strength, these rails can add significant weight to a transportation trailer. In some embodiments, a cargo tank with a sandwich-type construction can be strong enough to generally support itself, as well as an internal load, with a reduced (or no) need for extended support rails or other similar structures.

Some embodiments of the invention provide a transportation trailer including a cargo tank with a substantially cylindrical shell. The substantially cylindrical shell can include a rigid outer wall, an inner wall formed from metal, and an insulating core disposed between the outer wall and the inner wall. The insulating core can be configured to provide structural support to the substantially cylindrical shell.

Some embodiments of the invention provide a transportation trailer with a cargo tank. The cargo tank can include an inner wall, an outer wall, and an insulating core disposed between the outer wall and the inner wall. The inner wall, the outer wall and the insulating core can form a sandwich-type shell that includes at least one of: a plurality of sandwich-type panels connected by a plurality of substantially linear longitudinal welds, and a continuous spiral of at least one of the inner wall, the outer wall, and the insulating core, joined with a continuous spiral weld. The sandwich-type shell can be unsupported by structural rings, and the cargo tank can be a frameless cargo tank.

Some embodiments of the invention provide a method of forming a cargo tank having a substantially cylindrical shell with a sandwich-type construction. A first coil of outer-wall material, a second coil of insulating-core material, and a third coil of inner-wall material can be provided. The outer-wall material, the insulating-core material, and the inner-wall material can be decoiled from the first, second, and third coils, respectively. The insulating-core material can be joined to the inner-wall material and the outer-wall material to form at least one sandwich-type panel. The at least one sandwich-type panel can be welded to form the substantially cylindrical shell.

Some embodiments of the invention provide a transportation trailer including a cargo tank with a substantially cylindrical shell. The substantially cylindrical shell can include an outer wall, an inner wall, and a structural insulating core disposed between the outer wall and the inner wall. The transportation trailer can not include structural rings around the substantially cylindrical shell or can not include a frame member that extends from a front end of the substantially cylindrical shell to a rear end of the substantially cylindrical shell.

BRIEF DESCRIPTION OF THE DRAWINGS

FIGS. 13A through 13C are front cross-sectional views similar to FIGS. 11A and 11B, illustrating the use of metal weld tabs in construction of a cargo tank with sandwich-type panels according to one embodiment of the invention.

DETAILED DESCRIPTION

Figure 1A:
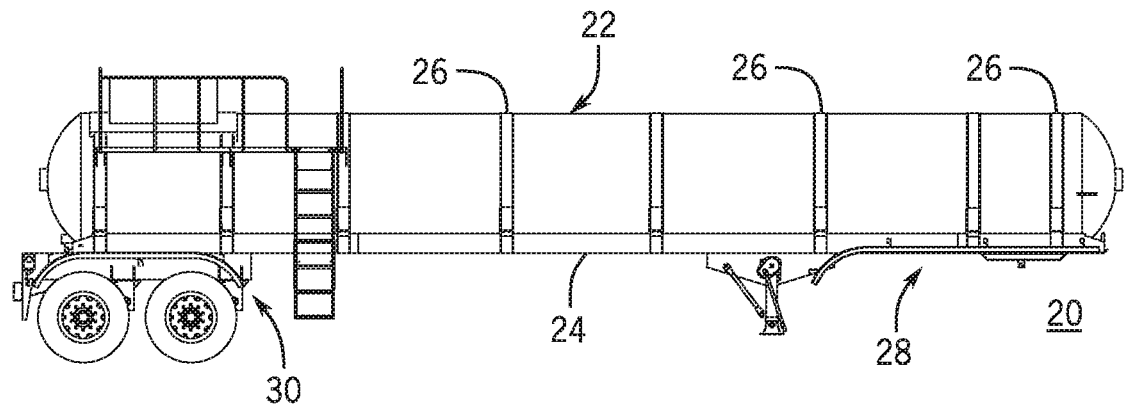
FIG. 1A is a right side elevation view of a conventional transportation trailer with a conventional cargo tank.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein in the context of elongate tanks, unless otherwise specified or limited, "longitudinal" generally refers to a direction extending along a long axis of a tank. For example, for a generally cylindrical cargo tank, a "longitudinal" seam is a seam oriented along a direction that generally extends between opposite axial ends of the cargo tank.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the invention, reference will now be made to illustrative embodiments shown in the attached drawings and specific language will be used to describe the same. While some concepts of the invention are described below in relation to transportation trailers, and more specifically to transportation trailers configured as mobile cargo tanks, some embodiments can alternatively (or additionally) include stationary tanks and vessels.

Figure 1B:
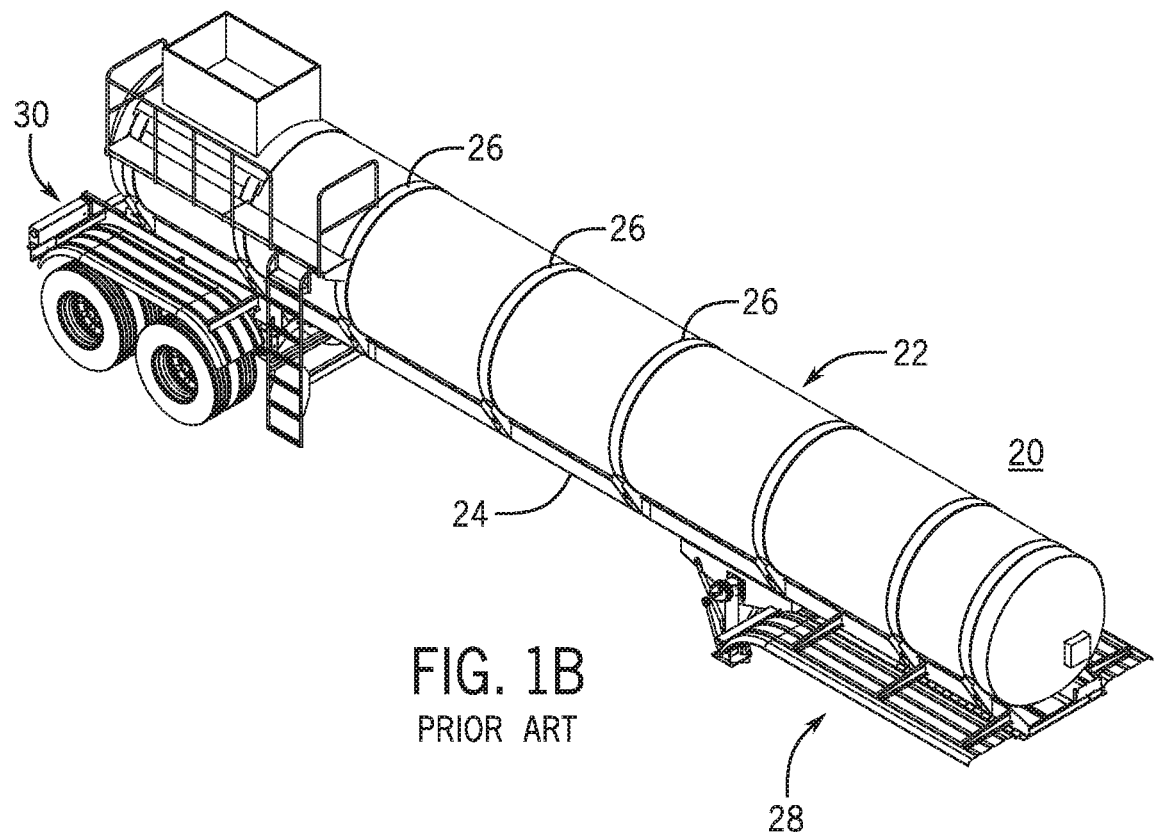
FIG. 1B is a top, front, right isometric view of the conventional transportation trailer of FIG. 1A.

A conventional trailer 20 with a conventional FRP cargo tank 22 is illustrated in FIGS. 1A and 1B. In order to appropriately support the cargo tank 22, the trailer 20 includes a pair of elongate metal frame rails 24 (only one visible in FIGS. 1A and 1B). The cargo tank 22 is secured to the frame rails 24 with a series of straps 26, and is supported along its entire length by the frame rails 24. In turn, the frame rails 24 are secured to and supported by a front chassis frame 28 and a rear chassis frame 30. As also discussed above, structures like the frame rails 24 can contribute significantly to the overall weight of the trailer 20, with a correspondingly negative effect on the total cargo weight that may be carried by the cargo tank 22.

Figure 2:
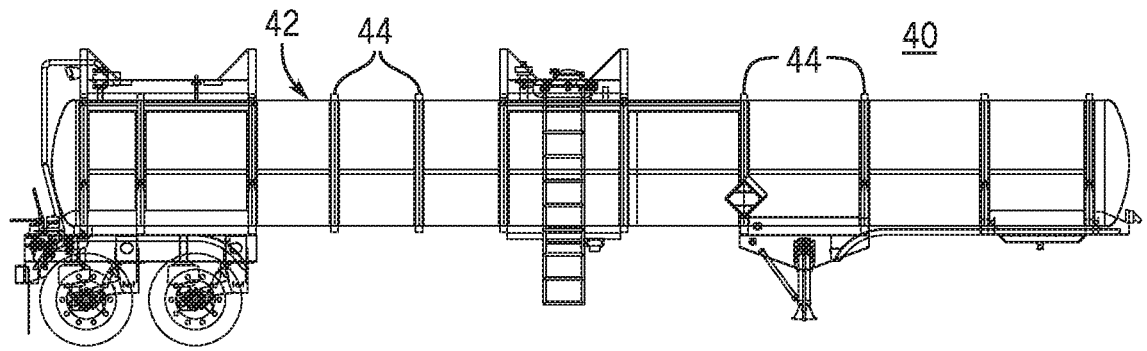
FIG. 2 is a right side elevation view of another conventional transportation trailer with a conventional cargo tank.
Figure 3:
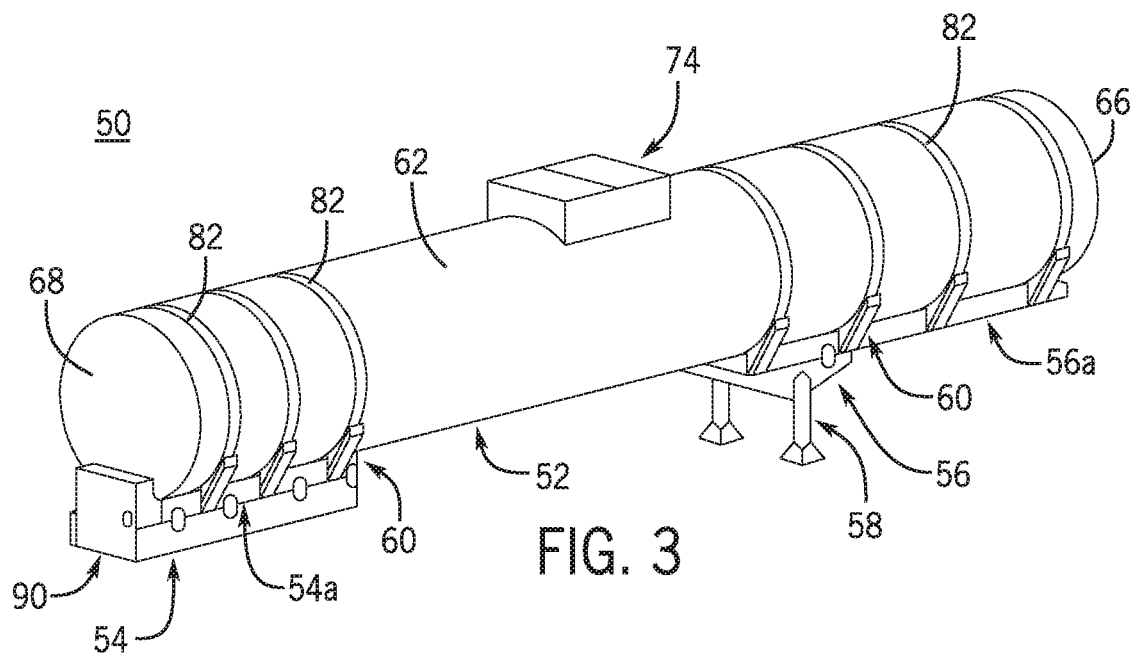
FIG. 3 is a simplified top, rear, right isometric view of a transportation trailer according to one embodiment of the invention, including a cargo tank with a sandwich-type construction.
Figure 4:
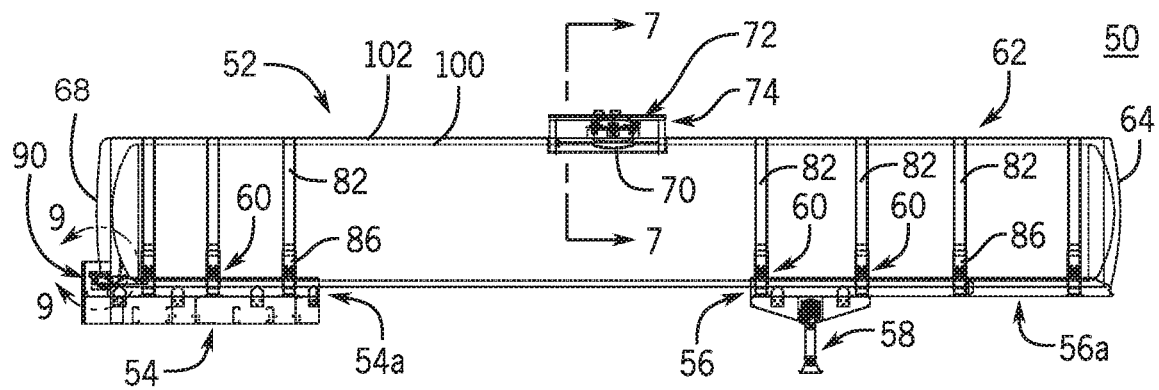
FIG. 4 is a right side elevation view of the transportation trailer of FIG. 3 rendered partially transparent to illustrate some internal structures of the cargo tank.
Figures 5, 6:
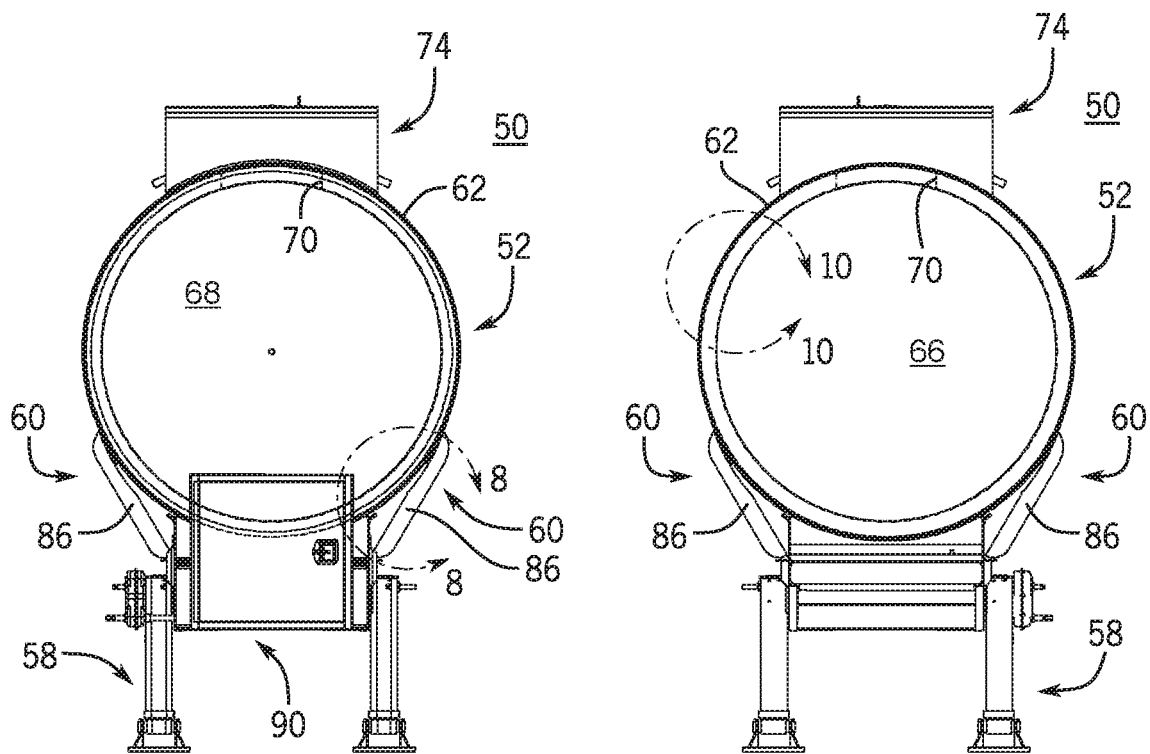
FIG. 5 is a rear elevation view of the transportation trailer of FIGS. 3 and 4, also rendered partially transparent to illustrate some internal structures of the cargo tank.
FIG. 6 is a front elevation view of the transportation trailer of FIGS. 3 through 5, also rendered partially transparent to illustrate some internal structures of the cargo tank.

Another conventional trailer 40 with a conventional steel cargo tank 42 is illustrated in FIG. 2. In order to provide appropriate strength to the cargo tank 42, the trailer 40 includes a set of metal support rings 44 spaced along the entire length of the cargo tank 42. While the support rings 44 can generally help to strengthen the cargo tank 42, the support rings 44 can also add significant weight to the trailer 40, thereby generally reducing the carrying capacity of the trailer 40. Because the support rings 44 extend between the interior and exterior of the cargo tank 42, the support rings 44 can also provide a thermal bridge between the interior and the exterior of the cargo tank 42, with corresponding detrimental effects on the thermal performance of the cargo tank 42. Further, the need to weld each of the support rings 44 in place can add significantly to the cost and complexity of manufacturing, while also increasing the risk of corrosion or other issues due to the precipitation of chromium carbide and other thermal effects.

In contrast, FIGS. 3 through 6 illustrate an insulated transportation trailer 50 according to one embodiment of the invention. The transportation trailer 50 includes an insulated cargo tank 52 that is generally configured to maintain a desired temperature range for a product contained therein for an appropriate amount of time. Accordingly, the transportation trailer 50 can generally be used for transporting liquid food-grade and non-food-grade product.

In other embodiments, a cargo tank (and transportation trailer) according to the invention can be configured in other ways, including for the transport of other types of products. In some embodiments, for example, the cargo tank 52 can be used as an MC 300 series cargo tank, a DOT 400 series cargo tank, or a non-DOT-specification cargo tank. In other embodiments, the concepts of the present disclosure can allow for other uses and configurations. For example, a cargo tank according to the invention can be configured to carry food-grade products such as dairy, food, or beverages, can be configured as a chemical or petro-chemical tank, can be configured to carry hot products or cold products, can be configured to carry hazardous liquids or industrial waste, and so on. In some embodiments, cargo tanks according to the invention can have a cargo capacity, for example, of between approximately 7,500 to 12,000 gallons.

In the illustrated embodiment, the cargo tank 52 includes a single inner storage compartment or compartment section and thus is generally capable of transporting a single product at any given time. In some embodiments, the cargo tank 52 can be configured to include a plurality of inner compartments or compartment sections, and can accordingly be capable of transporting a plurality of different products at any given time.

To support the cargo tank 52 for transport, front and rear mounting assembly components are configured, respectively, as a rear chassis frame 54 and a front chassis frame 56. The cargo tank 52 is disposed on rear and front saddles 54a and 56a, which are in turn supported, respectively, by the rear and front chassis frames 54, 56. Accordingly, the chassis frames 54, 56 generally support the cargo tank 52 during both rest and movement of the transportation trailer 50. The front chassis frame 56 is generally configured to be coupled to a truck or "tractor" (not shown) that can provide motive power to haul the transportation trailer 50. In some embodiments, the rear chassis frame 54 can be configured to attach the cargo tank 52 to a rear wheel assembly (not shown) for wheeled transport of the transportation trailer 50.

In the illustrated embodiment, the transportation trailer 50 further includes a landing gear assembly 58 coupled to and depending from the front chassis frame 56, and a plurality of mounting assemblies 60 (only select instances of the mounting assemblies indicated with reference numbers). Generally, the mounting assemblies 60 are configured to couple the cargo tank 52 to the front and rear chassis frames 54, 56. In other embodiments, additional (or alternative) components can be included to help anchor and support the cargo tank 52 to one or both of the front and rear chassis frames 54, 56.

In contrast to the frame rails 24 illustrated in FIGS. 1A and 1B, the rear and front chassis frames 54, 56 do not collectively extend along the entire length of the cargo tank 52. Accordingly, in contrast to the conventional trailer 20 of FIGS. 1A and 1B, the transportation trailer 50 does not include a full-length frame that extends fully between opposite longitudinal ends of the transportation trailer 50 (or fully between opposite longitudinal ends of the cargo tank 52). For the purposes of this disclosure, because frame members (e.g., frame rails) do not extend continuously between front and rear ends of the transportation trailer 50, the transportation trailer 50 can generally be considered to be a "frameless" trailer.

Because the cargo tank 52 is frameless—e.g., is supported only by the chassis frames 54, 56 at opposite ends of the transportation trailer 50, rather than full-length frame rails— the transportation trailer 50 may have a significantly reduced overall weight as compared to conventional trailers. For example, in contrast to the transportation trailer 50, the conventional trailer 20 of FIGS. 1A and 1B includes substantial weight in the form of the frame rails 24. Thus, the transportation trailer 50 can exhibit a significantly reduced overall weight relative to the conventional trailer 20. Further, through the exclusion of frame rails or other similar structures, the transportation trailer 50 can exhibit fewer and generally less complex components than the conventional trailer 20, thus further reducing time and cost in the manufacturing and assembly processes.

In addition to the beneficial reduction in overall weight of the frameless configuration of the transportation trailer 50, the elimination of full-length frame rails also allows the rear and front saddles 54a, 56a to be mounted directly to the rear and front chassis frames 54, 56. This can correspondingly lower the center of gravity of the cargo tank 52, and of the transportation trailer 50 generally, thereby further improving the stability and safety of the transportation trailer 50.

In the embodiment illustrated in FIGS. 3 through 6, the lightweight but strong construction of the cargo tank 52 (as also discussed below) generally permits the use of the illustrated frameless construction without significantly compromising the overall structural integrity of the transportation trailer 50. In other embodiments, other configurations can provide similar benefits. In some embodiments, for example, transportation trailers according to the invention may exhibit other features discussed herein, but may not be frameless, and may accordingly include full-length frame members similar to the frame rails 24 of FIGS. 1A and 1B.

As also discussed below, the cargo tank 52 is generally formed from a sandwich-type composite panel that can help to reduce the overall weight of the cargo tank 52 (e.g., as discussed above), while also providing relatively large structural strength as compared to conventionally-constructed cargo tanks. This comparatively increased strength can reduce or even eliminate the need for outer, structural rings around the cargo tank 52 (as seen in FIG. 2), thereby further reducing the overall weight of the cargo tank 52 as compared to conventional configurations. Additionally, because the noted structural rings are generally formed from metal, the elimination (or reduction) of structural rings from the cargo tank 52 may eliminate (or significantly reduce) the existence of thermal bridges between an inside of the cargo tank 52 and an outside of the cargo tank 52. As such, the configuration of the cargo tank 52 can result in relatively more efficient maintenance of product temperature within the cargo tank 52, as well as reduced overall weight.

The elimination (or reduction in number) of structural rings around the cargo tank 52 may also result in a corresponding elimination (or reduction) of circumferential weld seams on the cargo tank 52 (e.g., as are conventionally employed to attach the metal structural rings 44 to the tank 42 in the trailer 40 of FIG. 2). This elimination (or reduction) of circumferential weld seams may generally improve the structural integrity of the cargo tank 52 while also possibly eliminating or reducing the possibility of circumferential seam failures. Further, as also discussed above, the elimination (or reduction) of weld seams from a cargo tank may result in a corresponding elimination or reduction of corrosion problems, manufacturing cost, and other potential issues for the cargo tank 52.

In the embodiment illustrated in FIGS. 3-6, the cargo tank 52 includes a generally cylindrical shell 62, with front and rear torispherical heads 66, 68 coupled to the front and rear ends of the shell 62, respectively. In other embodiments, any other suitable configurations are possible, including non-cylindrical shells, non-torispherical heads, and the like.

Figure 7:
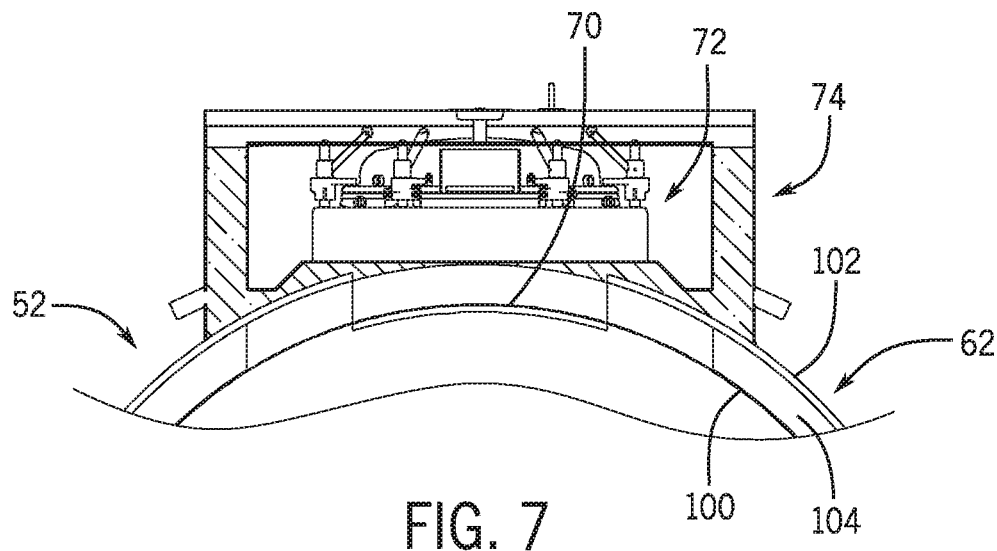
FIG. 7 is an enlarged rear sectional view taken along line 7-7 of FIG. 4, illustrating a top portion of the transportation trailer of FIGS. 3 through 6, including a manhole and related structures.

As illustrated in FIG. 7 in particular, the shell 62 also includes a manhole 70, generally located at the top of the shell 62, to permit individuals to enter the shell 62 to clean and service the cargo tank 52. A manhole cover 72 is provided to cover the manhole 70, with a manhole housing 74 that is generally coupled to the shell 62 of the cargo tank 52, and that generally surrounds and protects the manhole 70 and the manhole cover 72.

The manhole housing 74 of FIG. 7 is formed from 7-inch thick rigid foam. In other embodiments, other materials or thicknesses can be used. Also in the embodiment illustrated, the cargo tank 52 includes only one manhole (i.e., the manhole 70) and only one associated cover and housing pair (i.e., the manhole cover 72 and the manhole housing 74). In other embodiments, a cargo tank can include any number of manholes and associated manhole covers and housings at any suitable location along the cargo tank.

As also noted above, it may be useful to generally reduce (or eliminate) thermal bridges between the interior of a cargo tank and the exterior of the cargo tank. In some embodiments, this type of improvement can be extended to a manhole and related structures. As illustrated in FIG. 7, for example, a substantial portion of the manhole structure, including the manhole housing 74, is formed from structural foam. This may assist in reducing heat transfer into (or out of) the tank 52 near the manhole 70, including by allowing for the elimination (or reduction) of conventional metal structures, such as spill dams or deck plates, from around the manhole 70. In some embodiments, other features can be included. For example, one or more voids within the manhole housing 74 (e.g., between the manhole 70 and the manhole cover 72) can be filled with foam or other insulating material.

Figure 8:
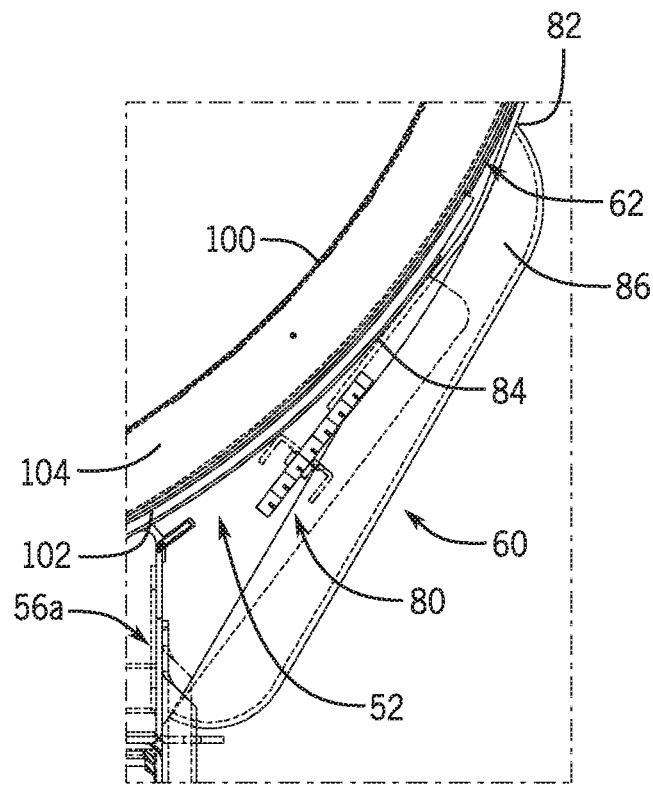
FIG. 8 is an enlarged rear sectional view illustrating aspects of area 8-8 of FIG. 5.

As illustrated in FIG. 8, each of the mounting assemblies 60 of the transportation trailer 50 includes a respective tightening component 80, which is secured to an associated mounting strap 82 that extends over and around an outside surface of the shell 62. With at least one of the tightening components 80 secured to at least one end of each of the straps 82, the tightening components 80 can be manipulated by a user (or otherwise) in order to tighten the mounting straps 82 around the shell 62 and thereby generally secure the cargo tank 52 to the rear and front chassis frames 54, 56. In the embodiment illustrated, each of the tightening components 80 includes a threaded rod and an associated bracket that collectively connect the relevant strap 82 to the relevant chassis frame 54 or 56. Accordingly, tightening the tightening components 80 can include advancing the threaded rods within the brackets to tighten the mounting straps 82 around the cargo tank 52 and thereby generally secure the cargo tank 52 to the chassis frames 54, 56. In other embodiments, other configurations for the tightening components 80 are possible.

In some embodiments, padding can be provided to cushion the cargo tank 52 or to help retain the cargo tank 52 on the rear and front chassis frames 54, 56. For example, in the embodiment illustrated, strips of rubber padding 84 are provided along part of the outside surface of the shell 62, generally adjacent to the tightening components 80 and the mounting straps 82. The rubber padding 84 can generally improve shock absorption for the cargo tank 52, as well as providing a friction surface to help retain the cargo tank 52 in the desired orientation on the chassis frames 54, 56.

As also seen in FIG. 8, an outer cover 86 is disposed over each of the tightening components 80. The outer covers 86 can generally provide protection against accidental contact with the tightening components 80, as well as generally improving the aesthetic appearance of the transportation trailer 50.

Figure 9:
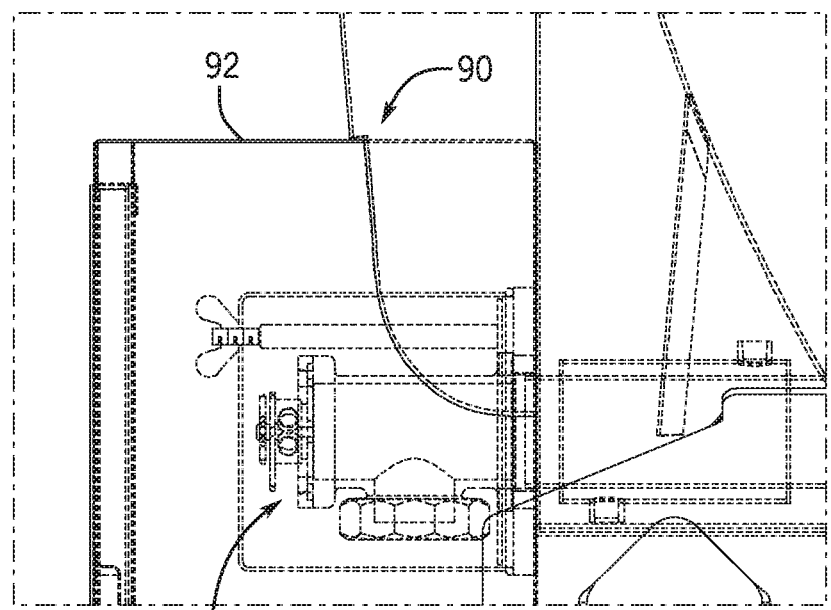
FIG. 9 is an enlarged right elevation view of a cabinet assembly of the transportation trailer of FIGS. 3 through 6, rendered partially transparent to illustrate aspects of area 9-9 of FIG. 4.

FIG. 9 illustrates aspects of a cabinet assembly 90 of the cargo trailer 52, including an outer cabinet 92 and an outlet 94. In the embodiment illustrated, the cabinet assembly 90 is coupled to a rear end of the rear chassis frame 56 near the rear head 68 of the cargo tank 52. The cabinet assembly 90 may include various components including, but not limited to, pumps, pistons, valves, vents, hoses, and so on, which can be used during loading and unloading of product or at other times. In other embodiments, other devices and components can be additionally (or alternatively) disposed on or within the cabinet assembly 90.

As also noted above, cargo tanks according to the invention are generally constructed to be both strong and lightweight, as well as to provide relatively substantial insulation for liquids (or other material) within the cargo tanks. An example of such construction, as relates to the shell 62 of the cargo tank 52, is illustrated in detail in FIG. 10. In place of a solid wall, as may be typical in some conventional constructions, the shell 62 of the cargo tank 52 exhibits a sandwich-type construction, with an inner wall 100, an outer wall 102, and an insulating core 104 between the inner and outer walls 100, 102. In the embodiment illustrated in FIG. 10, the inner wall 100 is formed from stainless steel, the insulating core 104 is formed from a rigid foam, and the outer wall 102 is formed from a composite material. In other embodiments, other configurations are possible.

Figure 11A:
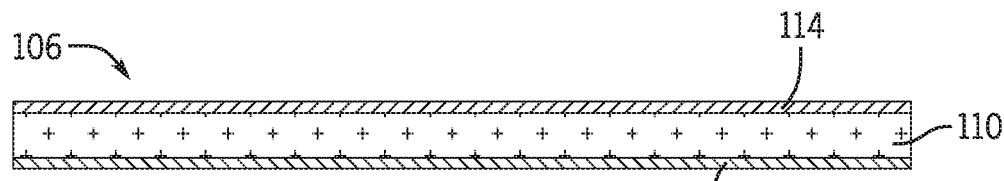
FIG. 11A is a front cross-sectional view of an example arrangement of a sandwich-type panel that may be used to form a shell of a cargo tank of a transportation trailer according to one embodiment of the invention.
Figure 11B:
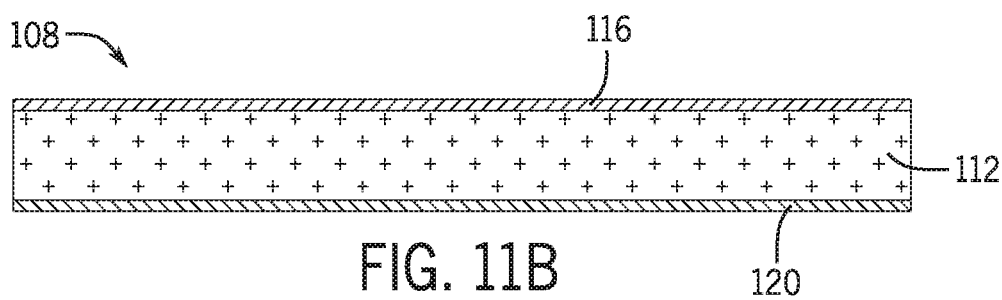
FIG. 11B is a front cross-sectional view similar to FIG. 11A, illustrating another example arrangement of a sandwich-type panel that may be used to form a shell of a cargo tank of a transportation trailer according to one embodiment of the invention.

As illustrated, the stainless steel of the inner wall 100 is relatively thin and light-weight 18 gauge stainless steel, although any suitable gauge of stainless steel (or other material) can be used. Likewise, the insulating core 104 is formed from a plastic material, such as a thermoplastic foam. Generally, the insulating core 104 of the cargo tank 52 may be formed with any suitable thickness. For example, sandwich-type composite panels 106 and 108, as illustrated in FIGS. 11A and 11B, are generally configured to be formed into a shell similar to the shell 62, and exhibit respective foam cores 110 and 112 of different respective thicknesses.

Generally, an insulating core of a shell according to the invention (e.g., the insulating core 104 of the shell 62) can be formed from one or more of a variety of different insulating materials, including composite materials and combinations of different materials. In some embodiments, the insulating core 104 can include one or more of a variety of foam types, including low-, medium-, or high-density foam. In some embodiments, the insulating core 104 can be formed from closed-cell foam, in order to help prevent fluid transfer through the insulating core 104. For example, the insulating core 104 can be formed from polyethersulfone-based foams such as Divinycell® Foam Core provided by BASF Corporation. (Divinycell is a registered trademark of Diab Group in the United States and/or other jurisdictions.) In some embodiments, the insulating core 104 may be formed from rubber, or from various other insulating materials.

Generally, it can be useful to configured an insulating core of a shell according to the invention (e.g., the insulating core 104 of the shell 62) so that the insulating core provides structural support to the shell—i.e., is a "structural" insulating core. In this regard, for example, the insulating core can assist in transferring loading forces between inner and outer walls of the shell as well as itself bearing loads to provide a degree of structural rigidity to the shell. In contrast, for example, some conventional tanks can include cores formed from fiberglass insulation or other similar materials, which can provide a useful thermal barrier but may not necessarily themselves support a load or serve to usefully transfer loading forces between inner and outer walls of the tanks. Accordingly, for example, the cores of conventional tanks may not necessarily provide any increased structural rigidity to the tanks over and above the rigidity provided by the inner or outer walls of the tanks and other structural components (e.g., structural rings and frame rails).

As also noted above, an outer wall of a shell according to the invention (e.g., the outer wall 102 of the shell 62) is generally formed from a composite material (e.g., plastics or polymers, generally). In some embodiments, the composite material of the outer wall 102 can include a FRP material made from a plastic pultrusion with embedded fiber reinforcements (e.g., glass, carbon or other fibers). In some embodiments, the outer wall 102 can be formed as a wrap of FRP material over the insulating core 104. In some embodiments, the outer wall 102 can be formed from vinyl ester or other suitable polymers such as acetal copolymer or acetal homopolymer similar to Delrin® resin. (Delrin is a registered trademark of E. I. du Pont de Nemours and Company in the United States and/or other jurisdictions.)

In some embodiments, however, an outer wall of a shell according to the invention (e.g., the outer wall 102) can be formed from one or more non-composite materials such as sheets of ferrous or non-ferrous metal, sheets of metal alloys, and so on. For example, respective outer walls 114, 116 (and, in some embodiments, inner walls 118, 120) of the panels 106, 108 of FIGS. 11A and 11B can be formed from stainless steel, including from 24 gauge (or thinner) stainless steel sheets. In some embodiments, portions of a sandwich-type panel can be formed from sheets of steel or other materials with different gauges. For example, some embodiments can include outer or inner walls formed from sheets of between 7 and 26 gauge. In some embodiments, an inner or outer wall of a sandwich-type panel of a shell according to the invention may be made from galvanized steel (not shown). In some embodiments, inner or outer walls of a shell according to the invention can be formed from plastics or other composites that incorporate one or more ferrous or nonferrous materials therein. In some embodiments, a shell can include multiple inner or multiple outer layers.

In some embodiments, an outer wall of a shell according to the invention (e.g., the outer wall 102) can be formed through a spraying process, in which one or more materials are sprayed, and set, onto the core of the shell (e.g., the insulating core 104). For example, in some embodiments, the inner wall and core of a shell can be formed (e.g., into a final substantially cylindrical shape), then a material such as urethane or isocyanate foam can be sprayed over the shell to form a suitable outer wall.

Figure 10:
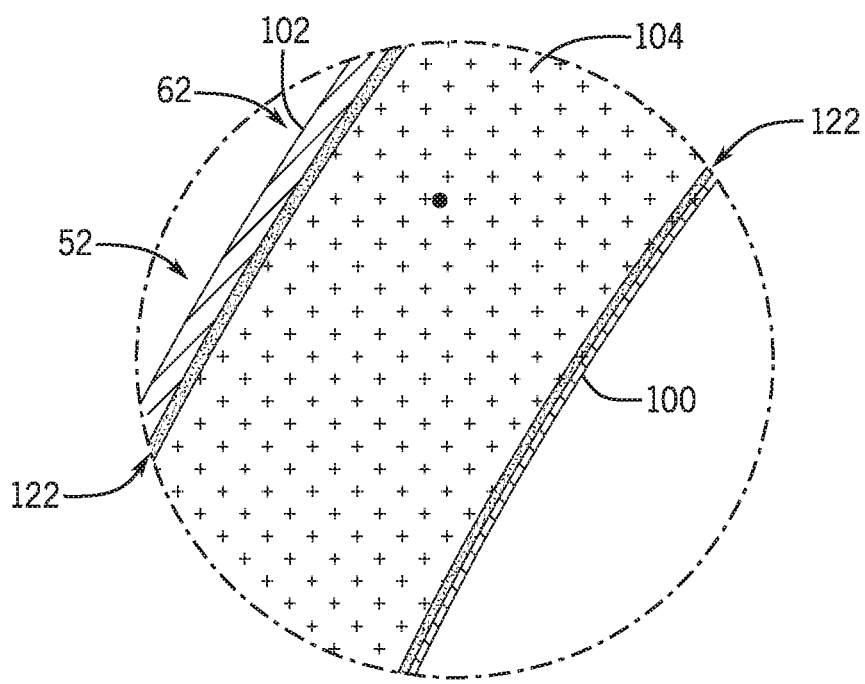
FIG. 10 is an enlarged front sectional view of the cargo tank of transportation trailer of FIGS. 3 through 6, illustrating aspects of area 10-10 of FIG. 6, including an inner wall, an insulating core, and an outer wall of the cargo tank.

Generally, for optimal structural integrity and thermal performance of a cargo tank, it may be useful to ensure that the layers of a sandwich-type construction essentially function as a single layer. To this end, in some embodiments, an adhesive can be used to secure one or more layers of a sandwich-type construction together. As illustrated in FIG. 10, for example, separate adhesive layers 122 are provided to couple the inner wall 100 to an inner surface of the insulating core 104 and to couple the outer wall 102 to an outer surface of the insulating core 104. Each of the adhesive layers 122 can be configured, for example, to include spray-on adhesive, tape, brushed-on adhesive, or adhesives of various other types. In some embodiments, different adhesives can be used for each of the adhesive layers 122.

In some embodiments, the layers of a sandwich-type construction can be secured together in other ways. For example, in some embodiments, mechanical fasteners can be used to secure outer and inner walls of a sandwich-type panel to a core of the panel. Likewise, in some embodiments, heat can be applied in order to secure the outer and inner walls of a sandwich-type panel to a core of the panel (e.g., through phase changes or heat-induced chemical reactions). In some embodiments, an outer (or other) wall of a cargo tank can be already bonded to an insulating core when construction of the cargo tank commences.

In some embodiments, the cargo tank 52 (or other tanks according to the invention) can be formed from DURA-PLATE® composite panel provided by Wabash National Corporation of Lafayette, Ind., or from other similar sandwich-type panels. (DURAPLATE is a registered trademark of Wabash National Corporation in the United States and/or other jurisdictions.) Generally, DURAPLATE® composite panels are constructed of a high-density polyethylene plastic core bonded between two high-strength skins. In some embodiments, the inner and outer skins respectively can be formed from a metal or metallic composition, examples of which include, but should not be limited to aluminum, galvanized steel, fully hardened steel such as AISI Grade E steel, stainless steel, and so on. In one embodiment, for example, the outer skin can be formed of ASTM G90 galvanized steel, and the inner skin can be formed of ASTM G40 galvanized steel.

In some embodiments, a tank can be formed from DURA-PLATE® panels having a thickness of approximately between 0.08 inch and 0.20 inch thick, with a preferred thickness of approximately 0.10 inch thick. In other embodiments, sandwich-panel type panels used to form a shell according to the invention (e.g., the shell 62 of the cargo tank 52) can be formed from panels with more substantial thickness. For example, panels with relatively thick insulating cores can be used in order to further improve the insulating properties of the relevant tank.

In some embodiments, an inner or outer wall of a cargo tank can be formed from a multi-layer material. For example, in some embodiments, an inner or outer wall (or both) of a cargo tank can be formed from DURAPLATE®, with an insulating core of other material (e.g., closed-cell foam) disposed between the inner and outer walls.

As also noted above, embodiments of the invention can include cargo tanks with shells (e.g., the shell 62 of the cargo tank 52) that do not include any of the support rings that are often used to enhance the structural integrity of conventional insulated and non-insulated cargo tanks (e.g., the cargo tank 42 of FIG. 2). In some embodiments, this exclusion of stiffening rings—and the corresponding elimination of structural weight and thermal bridges—can be enabled by the disclosed use of relatively lightweight, sandwich-type panels to construct the shells of the relevant cargo tanks, as well as by the construction methods discussed below. For example, as also noted above, by spacing distinct inner and outer walls apart from each other, sandwich-type construction of panels for cargo tanks can generally provide for a relatively large section modulus for the tanks. Accordingly, an appropriately rigid outer wall in a sandwich-type cargo tank can allow for an inner wall of the cargo tank to have a reduced thickness relative to tank walls of some comparable conventional designs, while still potentially allowing the tank to exhibit generally increased overall strength.

In different embodiments, construction of a cargo tank according to the invention (e.g., a frameless and ringless tank) can proceed in different ways. In some embodiments, for example, a shell of a cargo tank according to the invention can be manufactured using flat seam welding or spiral welding. As well as allowing for the exclusion of structural rings, both of these general manufacturing methods (and, others, in some embodiments) can allow for the elimination of a centrally-located circumferential weld seam that is included in the middle region of many conventional cargo tanks. The elimination of such a center circumferential seam may further improve the overall structural integrity of the relevant cargo tank, thereby potentially allowing for the cargo tank to carry relatively larger payloads.

Figure 12:
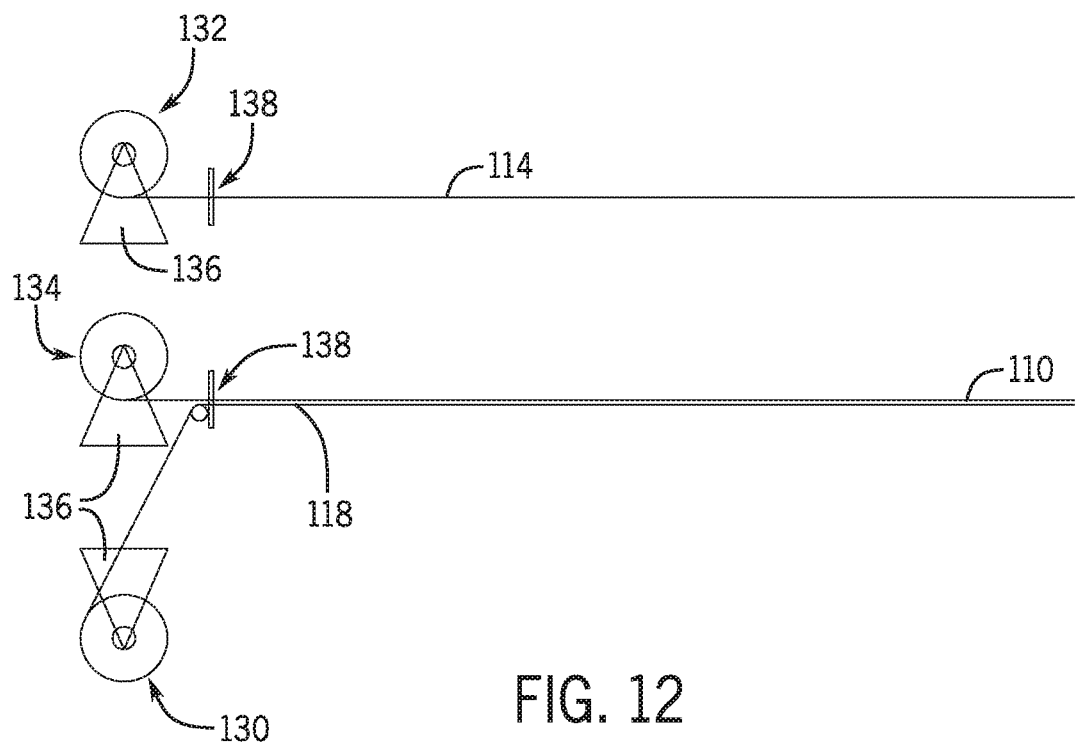
FIG. 12 is a schematic view of part of a process for forming sandwich-type panels for a cargo tank according to one embodiment of the invention.

In some embodiments, multiple coils of separate materials can be arranged in relative proximity on a manufacturing floor, then uncoiled together (to greater or lesser degrees) in order to form an elongate sandwich-type panel of almost any desired length. In this regard, for example, aspects of a flat-seam welding process that can be used to form the panel 106 of FIG. 11A are schematically illustrated in FIG. 12. In the embodiment illustrated, a manufacturing station includes a coil 130 of the material used to form the inner wall 118 (see FIG. 11A), a coil 132 of the material used to form the outer wall 114 (see FIG. 11A), and a coil 134 of the material for the foam core 110 (see FIG. 11A). Each of the coils 130, 132, 134 is supported by a respective decoiler 136, so that the coils 130, 132, 134 may be decoiled into sheets to form the inner wall 118, the outer wall 114, and the foam core 110 of the panel 106.

In some embodiments, the coils 130, 132, 134 can be decoiled substantially simultaneously. In some embodiments, the coils 130, 132, 134 can be decoiled separately, in a variety of sequences.

In some embodiments, the coil 134 of the material for the foam core 110 can be somewhat less wide than the coils 130, 132 of material for the inner and outer walls 118, 114. This can be useful, for example, to provide a longitudinal groove to receive one or more weld tabs, as also discussed below.

Generally, during manufacture, the coils 130, 132, 134 are decoiled from the decoilers 136, so that the panel 106 is formed with a length that is substantially equal to a full length of the cargo tank to be formed. Once an appropriate length has been obtained, one or more cutting devices 138 are then used to cut the decoiled materials from the coils 130, 132, 134. Subsequently (or at other times), the inner wall 118, the foam core 110, and the outer wall 114 can be coupled together into the fully-formed panel 106, including through the use of adhesives, as also discussed above.

To complete formation of the relevant cargo tank, additional panels (not shown) similar to the panel 106 can be formed, and arranged side-by-side with the panel 106. The additional panels, as well as the panel 106 can be shaped (e.g., before or after the side-by-side placement) into a cylindrical or partial cylindrical profiles as appropriate. The side-by-side panels, including the panel 106, can then be welded together along adjacent longitudinal sides of the panels to form an open-ended cylinder for a cargo tank shell (e.g., similar to the shell 62 of FIGS. 3 through 6). Heads for the shell, such as the heads 66, 68 (see, e.g., FIG. 3), can also be added as appropriate.

In the construction method discussed above, and in other similar construction methods, because each of the panels can be formed to extend fully over any length that is desired for a cargo tank, only longitudinal seams may be necessary to connect the panels together along the length of the cargo tank. Accordingly, the use of the method illustrated in FIG. 12 (and similar other methods) may eliminate the need for a centrally-located circumferential weld seam on the resulting tank. In contrast, under conventional methods, the use of relatively short panels to form relatively long cargo tanks may inevitably require circumferential weld seams.

In some embodiments, resistance welding can be used to join the relatively thin walls of sandwich-type panels into a formed shell of a cargo tank. This can be beneficial, for example, because resistance welding can result in a relatively small heat-affected zone, as compared to other types of welding (e.g., tungsten inert gas ("TIG"), metal inert gas ("MIG"), or plasma welding). Accordingly, potentially detrimental effects of heating the tank walls during manufacturing (e.g., increased susceptibility to corrosion) can be reduced. In some embodiments, however, other types of welding can be used, including TIG, MIG, laser, plasma, or other types of welding.

In some embodiments, metal tabs can be inserted along the longitudinal edges of a sandwich-type panel in order to assist in welding adjacent panels together to form a cargo tank. As illustrated in FIG. 13A, for example, a sandwich-type composite panel 106a, generally similar to the panel 106 (see FIG. 11A) includes metal weld tabs 150a, 152a that are inserted between inner and outer walls 100a, 102a along the longitudinal sides of panel 106a. In some embodiments, the weld tabs 150a, 152a can extend continuously along the entire length of the panel 106a. In some embodiments, multiple discrete weld tabs (not shown) can be used along one or both sides of a panel.

Generally, the weld tabs 150a, 152a are configured to allow adjacent instances of the panel 106a (or other panels) to be welding together with relatively high-strength welds. As illustrated in FIG. 13B, for example, the panel 106a can be arranged side-by-side with two similarly configured panels 106b, 106c, with the weld tab 150a of the panel 106a butted against a similar weld tab 150b of the panel 106b, and with the weld tab 152a extending into a longitudinal groove 156 of the panel 106c. As illustrated in FIG. 13C, the weld tabs 150a and 150b can then be welded together using a full-penetration butt-type weld 158 (e.g., rather than using resistance or laser welds). This can be useful, in some embodiments, in order to provide for a relatively more substantial weld seam to be created. In contrast, rather than facilitate a full-penetration weld, the weld tab 152a can underlie and generally support butt-type welds 160 between adjacent ends of the inner and outer walls 118a, 114a of the panel 106a and inner and outer walls 118c, 114c of the panel 106c. In the embodiment illustrated, the butt-type welds between the panels 106a and 106c do not penetrate into the panels 106a and 106c substantially past the inner and outer walls 118a, 114a of the panel 106a and the inner and outer walls 118c, 114c of the panel 106c. In other embodiments, other configurations are possible.

In some embodiments, other methods can be used to form a cargo tank according to the invention. For example, a shell 162 of a cargo tank similar to the cargo tank 52 can be formed using an example spiral decoiling and welding process that is illustrated schematically in FIG. 14. (The shell 162 is illustrated as only partly formed in FIG. 14.) The illustrated spiral weld process uses consecutively arranged decoilers 164, 166, 168, each oriented at a non-right angle relative to a longitudinal axis of the shell 162. Each of the decoilers supports a respective roll of material, which can be simultaneously decoiled to allow for generally continuous spiral formation of the shell 162. For example, the decoiler 164 can support a roll of material for an inner wall of the shell 162 (e.g., sheet metal), the decoiler 166 can support a roll of material for an insulating core of the shell 162 (e.g., closed-cell foam), and the decoiler 168 can support a roll of material for an outer wall of the shell 162 (e.g., more sheet metal or composite material). Accordingly, during formation of the shell 162, the decoilers 164, 166, 168 can be operated substantially simultaneously, in order to provide a continuously formed, spiral-wound, sandwich-type construction with inner and outer walls and an intervening insulating core. In some embodiments, the material from the decoilers 164, 166, 168 can be decoiled around a temporary internal support, such as a removable inner tube (not shown).

In some embodiments, one or more fixed-location (or other) welding devices can be disposed adjacent to the decoilers 164, 166, 168, thereby allowing metal layers of the shell 162 to be continuously welded during operation of the decoilers 164, 166, 168. For example, in the embodiment illustrated, a laser welder 170 is disposed opposite the decoilers 164, 166, 168 to weld a spiral seam along the inner-wall material from the decoiler 164 before the inner wall of the inchoate shell 162 is surrounded by the core material from the decoiler 166. In this way, for example, the inner wall of the shell 162 (and the shell 162 generally) can be manufactured in a relatively continuous manner.

In some embodiments, a welding device (not shown) similar to the laser welder 170 can also be arranged to weld a continuous spiral seam along the outer-wall material from the decoiler 168. In some embodiments, the core material from the decoiler 168 can be bonded directly to the material of the inner and outer walls after the inner wall is welded (or otherwise joined) but before the outer wall is welded (or otherwise joined). For example, a device to dispense or otherwise apply or activate adhesive (not shown) can also be disposed opposite the decoilers 164, 166, 168 (or elsewhere) to relatively continuously apply or activate adhesive on the core material.

In some embodiments, other types of welding devices can be used. For example, in the process illustrated in FIG. 14 (and in other processes according to the invention), stationary or other welding devices can be configured to use laser welding, gas tungsten arc welding ("GTAW") (also known as TIG welding), gas metal arc welding ("GMAW") including MIG or metal active gas ("MAG") welding, plasma arc welding ("PAW"), and so on.

In some embodiments, a cutting device can be used to cut a spiral-formed shell to any particular length. For example, a cutting device (not shown) can be disposed downstream of a final welding (or other joining) station in the process illustrated in FIG. 14. Accordingly, once the shell 162 has been formed to a desired length, the cutting device can be activated in order to cut the shell 162 for further processing (e.g., the addition of head walls).

Figure 14:
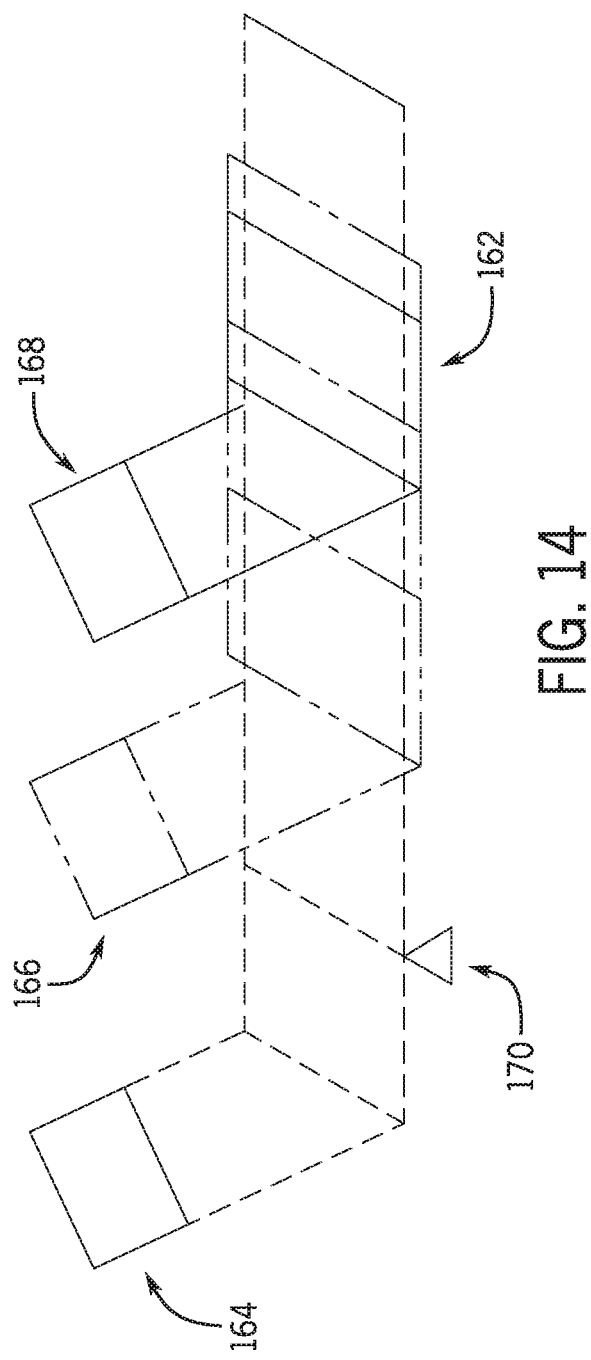
FIG. 14 is a schematic view of part of another process for forming a cargo tank with sandwich-type construction according to one embodiment of the invention.

The use of coils of material to form the layers of sandwich-type panels (and cargo tanks, generally) can sometimes provide additional benefits beyond those noted above. For example, flat-sheet material can often be shipped only in lengths of less than 66 feet. Accordingly, when using flat-sheet material to form a cargo tank longer than 66 feet (or shorter cargo tanks, for some construction methods), the cargo tank may need to include a welded circumferential seam. As noted above, such a seam can generally represent an area of increased weakness on the cargo tank, as well as an area of potentially increased corrosion. In contrast, where a cargo tank can be formed from coils of material, whether continuously (e.g., as illustrated in FIG. 14) or through the formation of multiple elongate panels (e.g., as illustrated in FIG. 12) circumferential seams can be generally avoided. For example, using a decoiling process such as one of those described above, elongate sandwich-type panels and spiral-wound sandwich-type shells can each be formed with any desired length, thereby potentially eliminating the need for circumferential welds.

In view of the discussion and examples presented above, it will be understood that cargo tanks according to the invention can be constructed to be relatively lightweight while also potentially exhibiting significant strength and thermal insulation. Further, cargo tanks according to some embodiments of the invention (e.g., the cargo tank 52) can entirely exclude metal support rings and full-length frame supports, as may be required to ensure appropriate structural integrity for many types of conventional cargo tanks. For example, through the inclusion of cargo tanks formed with sandwich-type construction, including a relatively thin inner wall, a core formed of foam, plastic, rubber or insulating material(s), and a relatively thin outer wall, embodiments of the invention can be both entirely ringless and/or frameless.

The foregoing description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A transportation trailer comprising:
   a cargo tank having a substantially cylindrical shell;
   the substantially cylindrical shell including:
   a rigid outer wall;
   an inner wall formed from metal; and
   an insulating core disposed between the rigid outer wall and the inner wall, the insulating core providing structural support to the substantially cylindrical shell,
   wherein the cargo tank does not include structural rings connected to the inner wall;

wherein the cargo tank does not include a frame extending from a front end of the substantially cylindrical shell to a rear end of the substantially cylindrical shell.

2. The transportation trailer of claim 1, further comprising:
a front mounting assembly coupled to a front end of the cargo tank; and
a rear mounting assembly coupled to a rear end of the cargo tank;
wherein the front mounting assembly is spaced apart from the rear mounting assembly and the transportation trailer does not include a frame member extending between the front mounting assembly and the rear mounting assembly to support the cargo tank.

3. The transportation trailer of claim 1, wherein the substantially cylindrical shell does not include a substantially circumferential weld seam.

4. The transportation trailer of claim 3, wherein the substantially cylindrical shell is formed from a plurality of panels joined together by substantially longitudinal weld seams, each of the panels including an outer wall portion, an inner wall portion, and an insulating core portion between the inner wall portion and the outer wall portion.

5. The transportation trailer of claim 3, wherein the substantially cylindrical shell is formed as at least one continuous spiral of outer-wall material, inner-wall material, and insulating-core material.

6. The transportation trailer of claim 5, wherein the at least one continuous spiral includes an inner spiral formed from the inner-wall material, an outer spiral formed from the outer-wall material, and an insulating spiral formed from the insulating-core material.

7. The transportation trailer of claim 1, wherein the rigid outer wall is a sprayed-on outer layer of the substantially cylindrical shell.

8. The transportation trailer of claim 1, wherein the insulating core includes a closed-cell foam material.

9. The transportation trailer of claim 1, wherein at least one of the inner wall and the rigid outer wall is formed from stainless steel.

10. The transportation trailer of claim 9, wherein the at least one of the inner wall and the rigid outer wall is formed from stainless steel of gauge 20 or thinner.

11. The transportation trailer of claim 1, wherein the cargo tank is configured to transport liquids.

12. A transportation trailer comprising:
a cargo tank that includes:
an inner wall;
an outer wall; and
an insulating core disposed between the outer wall and the inner wall;
the inner wall, the outer wall and the insulating core forming a sandwich-type shell that includes at least one of:
a plurality of sandwich-type panels connected by a plurality of substantially linear longitudinal welds; and
a continuous spiral of at least one of the inner wall, the outer wall, and the insulating core, joined with a continuous spiral weld;
the sandwich-type shell not being supported by structural rings; and
the cargo tank being a frameless cargo tank.

13. A method of forming a cargo tank having a substantially cylindrical shell with a sandwich-type construction, the method comprising:
providing a first coil of outer-wall material;
providing a second coil of insulating-core material;
providing a third coil of inner-wall material;
decoiling the outer-wall material, the insulating-core material, and the inner-wall material from the first, second, and third coils, respectively;
joining the insulating-core material to the inner-wall material and to the outer-wall material to form at least one sandwich-type panel;
welding the at least one sandwich-type panel to form the substantially cylindrical shell, wherein the insulating core provides structural support to the substantially cylindrical shell;
not including structural rings connected to the inner-wall material after the substantially cylindrical shell is formed; and
not providing a frame extending from a front end of the substantially cylindrical shell to a rear end of the substantially cylindrical shell after the substantially cylindrical shell is formed.

14. The method of claim 13, wherein forming the at least one sandwich-type panel includes forming a plurality of sandwich-type panels; and
wherein welding the at least one sandwich-type panel includes welding the plurality of sandwich-type panels using substantially linear longitudinal welds.

15. The method of claim 14, further comprising:
before welding the at least one sandwich-type panel, inserting at least one weld tab between the inner-wall material and the outer-wall material along at least one longitudinal edge of the at least one sandwich-type panel;
wherein welding the at least one sandwich-type panel includes welding the at least one sandwich-type panel adjacent to the at least one weld tab.

16. The method of claim 13, wherein the outer-wall material, the insulating-core material, and the inner-wall material are decoiled in at least one continuous spiral; and
wherein welding the at least one sandwich-type panel includes welding at least one continuous spiral seam.

17. The method of claim 13, wherein the formed cargo tank does not include a substantially circumferential weld seam.

18. The method of claim 13, wherein the at least one sandwich-type panel exceeds 66 feet in length.

19. A transportation trailer comprising:
a cargo tank having a substantially cylindrical shell;
the substantially cylindrical shell including:
an outer wall;
an inner wall; and
a structural insulating core disposed between the outer wall and the inner wall; and
the transportation trailer:
not including structural rings connected to the inner wall; and
not including a frame extending from a front end of the substantially cylindrical shell to a rear end of the substantially cylindrical shell.

20. A transportation trailer comprising:
a cargo tank having a substantially cylindrical shell;
the substantially cylindrical shell including:
a rigid outer wall;
an inner wall formed from metal;
an insulating core disposed between the rigid outer wall and the inner wall, the insulating core providing structural support to the substantially cylindrical shell;

a front mounting assembly coupled to a front end of the cargo tank; and a rear mounting assembly coupled to a rear end of the cargo tank;

wherein the front mounting assembly is spaced apart from the rear mounting assembly and the transportation trailer does not include a frame member extending between the front mounting assembly and the rear mounting assembly to support the cargo tank.

21. A transportation trailer comprising:

a cargo tank having a substantially cylindrical shell;

the substantially cylindrical shell including:

a rigid outer wall;

an inner wall formed from metal; and an insulating core disposed between the rigid outer wall and the inner wall, the insulating core providing structural support to the substantially cylindrical shell, wherein:

the substantially cylindrical shell does not include a substantially circumferential weld seam, and the substantially cylindrical shell is formed from a plurality of panels joined together by substantially longitudinal weld seams, each of the panels including an outer wall portion, an inner wall portion, and an insulating core portion between the inner wall portion and the outer wall portion.

* * * * *